United States Patent
Wang et al.

(10) Patent No.: US 10,466,498 B2
(45) Date of Patent: Nov. 5, 2019

(54) THREE-DIMENSIONAL DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 15/744,339

(22) PCT Filed: Aug. 2, 2017

(86) PCT No.: PCT/CN2017/095601
§ 371 (c)(1),
(2) Date: Jan. 12, 2018

(87) PCT Pub. No.: WO2018/072527
PCT Pub. Date: Apr. 26, 2018

(65) Prior Publication Data
US 2019/0004324 A1    Jan. 3, 2019

(30) Foreign Application Priority Data

Oct. 21, 2016    (CN) .......................... 2016 1 0920762

(51) Int. Cl.
*G02B 27/22*    (2018.01)
*G02B 27/30*    (2006.01)
(Continued)

(52) U.S. Cl.
CPC ........... *G02B 27/22* (2013.01); *G02B 5/1819* (2013.01); *G02B 6/122* (2013.01); *G02B 27/30* (2013.01);
(Continued)

(58) Field of Classification Search
CPC ...... G02B 27/22; G02B 5/1819; G02B 6/122; G02B 27/30; G02F 1/133602; H04N 13/349
See application file for complete search history.

(56) References Cited

U.S. PATENT DOCUMENTS

| | | |
|---|---|---|
| 2008/0231952 A1 | 9/2008 | Kim |
| 2012/0199081 A1 | 8/2012 | Daye |
| 2017/0363794 A1 | 12/2017 | Wan et al. |

FOREIGN PATENT DOCUMENTS

| | | |
|---|---|---|
| CN | 101271199 A | 9/2008 |
| CN | 201966999 U | 9/2011 |

(Continued)

OTHER PUBLICATIONS

Heilongjiang Four Dimensional Imaging Entpr Digital Technology Co Ltd, "Three-dimensional free stereoscopic display mobile phone", CN201966999, machine translation. (Year: 2011).*

(Continued)

*Primary Examiner* — Wen Huang
(74) *Attorney, Agent, or Firm* — Dilworth & Barrese, LLP; Michael J. Musella, Esq.

(57) ABSTRACT

A three-dimensional display device includes: a plurality of sub pixels and a plurality of grating structures in a one-to-one correspondence with the plurality of sub pixels; each grating structure is configured to enable light to emerge according to an assigned direction, so that emergent light of the three-dimensional display device is converged into at least two viewpoints at a left eye of an observer and converged into at least two viewpoints at a right eye of the observer.

19 Claims, 9 Drawing Sheets

(51) Int. Cl.
*G02B 6/122* (2006.01)
*G02F 1/1335* (2006.01)
*G02B 5/18* (2006.01)
*H04N 13/349* (2018.01)

(52) U.S. Cl.
CPC ..... *G02F 1/133602* (2013.01); *H04N 13/349* (2018.05)

(56) References Cited

FOREIGN PATENT DOCUMENTS

| CN | 104007552 A | 8/2014 |
| CN | 104460115 A | 3/2015 |
| CN | 106291958 A | 1/2017 |
| CN | 106324847 A | 1/2017 |

OTHER PUBLICATIONS

Search Report dated Feb. 16, 2017.
International Search Report dated Sep. 30, 2017.
First Chinese Office Action dated May 8, 2017.
Second Chinese Office Action dated Sep. 7, 2017.

\* cited by examiner

Position/mm

THREE-DIMENSIONAL DISPLAY DEVICE

TECHNICAL FIELD

The present disclosure relates to a technical field of display, and particularly, to a three-dimensional display device.

BACKGROUND

Currently, a 3D (Three-Dimensional) display technology has been paid much attention, the 3D display technology can enable an image to become stereoscopic and vivid, the most basic principle of the 3D display technology is that different images are respectively received by utilizing left and right human eyes and received image information is subjected to superposition regeneration via the brain so as to form an image with a stereoscopic directional effect.

SUMMARY

Embodiments of the present disclosure provide a three-dimensional display device for solving the problem that when the three-dimensional display device is viewed, a focusing position of one single eye and a converging position of double eyes are inconsistent.

An embodiment of the disclosure provide a three-dimensional display device, comprising: a plurality of sub pixels and a plurality of grating structures in a one-to-one correspondence with the plurality of sub pixels; each grating structure is configured to enable light to emerge according to an assigned direction, so that emergent light of the three-dimensional display device is converged into at least two viewpoints at a left eye of an observer and converged into at least two viewpoints at a right eye of the observer.

In some examples, the three-dimensional display device as mentioned above comprise: a liquid crystal display panel and a backlight module on a side of the liquid crystal panel facing away from its light emergent side, wherein the liquid crystal display panel includes the plurality of sub pixels, and the backlight module includes: at least one waveguide portion arranged in a laminating mode and a collimation light source located at a position of a light incident surface of each waveguide portion; and each grating structure is located on a side of each waveguide portion facing the liquid crystal display panel.

In some examples, in the three-dimensional display as mentioned above, each grating structure meets that:

$$k_0 n_2 \sin\theta_2 = k_0 n_1 \sin\theta_1 - q\frac{2\pi}{\Lambda},$$

wherein $k_0$ represents a wave vector, $$k_0 = \frac{2\pi}{\lambda},$$

$\lambda$ represents a wavelength of incident light, $n_1$ represents a refractive index of the waveguide portion, $n_2$ represent a refractive index of the air, $\theta_1$ represents a reflection angle for light to be totally reflected in the waveguide portion, $\theta_2$ represents an emergent angle of emergent light, $\Lambda$ represents a grating period of the grating structure, and $q=0, \pm 1, \pm 2, \ldots$ In some examples, in the three-dimensional display as mentioned above, the at least one waveguide portion comprises a first substrate with a waveguide function.

In some examples, in the three-dimensional display as mentioned above, the at least one waveguide portion comprises one first substrate; the collimation light source emits white light; and each grating structure is located on a side of the first substrate facing the liquid crystal display panel.

In some examples, in the three-dimensional display as mentioned above, the at least one waveguide portion comprises three first substrates; corresponding collimation light sources located on the light incident surfaces of different first substrates respectively emit different colors of light; and each grating structure is located on a side of a corresponding first substrate irradiated by the collimation light source with the same color as the sub pixel corresponding to the each grating structure, the side of the corresponding first substrate facing the liquid crystal display panel.

In some examples, in the three-dimensional display as mentioned above, a thickness of each grating structure is in a range of 100 nm to 700 nm.

In some examples, in the three-dimensional display as mentioned above, the at least one waveguide portion comprises a waveguide layer; and the backlight module further comprises: a second substrate located on a side of the waveguide layer farthest from the liquid crystal display panel, the side of the waveguide layer facing away from the liquid crystal display panel.

In some examples, in the three-dimensional display as mentioned above, the at least one waveguide portion comprises one waveguide layer; the collimation light source emits white light; and each grating structure is located on a side of the waveguide layer facing the liquid crystal display panel.

In some examples, in the three-dimensional display as mentioned above, the at least one waveguide portion comprises three waveguide layers; corresponding collimation light sources located on the light incident surfaces of different waveguide layers respectively emit different colors of light; and each grating structure is located on a side of a corresponding waveguide layer irradiated by the collimation light source with the same color as the sub pixel corresponding to the grating structure, the side of the corresponding waveguide facing the liquid crystal display panel.

In some examples, in the three-dimensional display as mentioned above, the backlight module further includes: a buffer layer located on a side of each waveguide layer facing the second substrate.

In some examples, in the three-dimensional display as mentioned above, the refractive index of the waveguide layer is in a range of 1.7 to 2.

In some examples, in the three-dimensional display as mentioned above, a thickness of the waveguide layer is in a range of 100 nm to 100 μm.

In some examples, in the three-dimensional display as mentioned above, the thickness of each grating structure is in a range of 100 nm to 500 nm.

In some examples, the three-dimensional display as mentioned above includes: a liquid crystal display panel and a backlight module on a side of the liquid crystal panel facing away from its light emergent side, wherein the liquid crystal display panel includes the plurality of sub pixels, and the backlight module is a direct-lit collimated backlight; each grating structure is located between the backlight module and the liquid crystal display panel; or, each grating structure is located inside the liquid crystal display panel; or, each grating structure is located on the light emergent side of the liquid crystal display panel.

In some examples, in the three-dimensional display as mentioned above, each grating structure meets that: $\sin \theta - \sin \theta_0 = \lambda/P$, where $\theta$ represents an emergent angle of emergent light, $\theta_0$ represents an incident angle of incident light, $\lambda$ represents a wavelength of the incident light, and P represents a grating period of the grating structure.

In some examples, in the three-dimensional display as mentioned above, an angle between light emitted by the backlight module and a plane where the liquid crystal display panel is located is in a range of 40 degrees to 80 degrees.

In some examples, in the three-dimensional display as mentioned above, a thickness of each grating structure is in a range of 100 nm to 700 nm.

In some examples, in the three-dimensional display as mentioned above, sight lines of at least two viewpoints of the left eye and sight lines of at least two viewpoints of the right eye are converged to the same position.

The three-dimensional display device provided by the embodiments of the present disclosure includes a plurality of sub pixels and a plurality of grating structures corresponding to each sub pixel one to one; and each grating structure is used for enabling light to emerge according to an assigned direction, so that emergent light of the three-dimensional display device is converged into at least two viewpoints at a left eye and converged into at least two viewpoints at a right eye. Therefore, the three-dimensional display device can implement single-eye focusing three-dimensional display, so that when a sight distance of the three-dimensional display device is designed to be equal to a sight distance of parallax three-dimensional display, the focusing position of one single eye and the converging position of sight lines of double eyes can be guaranteed to be consistent, thereby avoiding a case that when a viewer generates a dizzy feeling when viewing the three-dimensional display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1A:
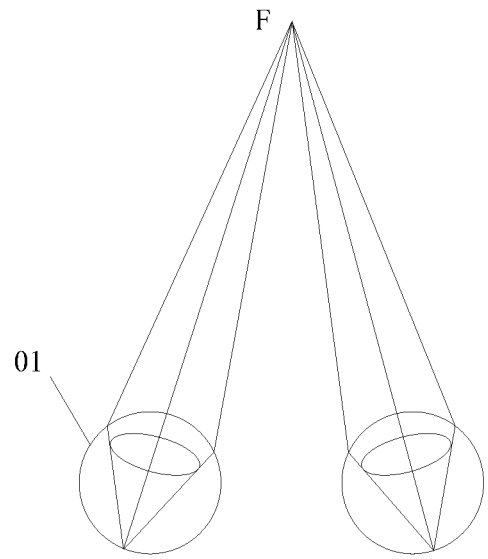
FIG. 1A is a schematic diagram that human eyes view a three-dimensional image in a real environment.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the drawings, a shape and a thickness of each film layer do not reflect a true scale of the film layer, and merely aim to schematically illustrate contents of the present disclosure.

Figure 1B:
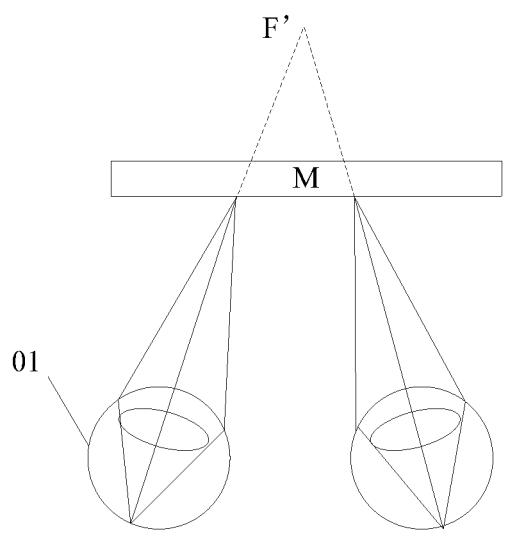
FIG. 1B is a schematic diagram that human eyes view a display image of a three-dimensional display device.

When human eyes observe an object in a real environment, as illustrated in FIG. 1A, a focusing position of one single eye is consistent with a converging position of sight lines of double eyes, and for example, both the focusing position of an eye 01 and the converging position of the sight lines of double eyes are located at a position F. When the human eyes observe an image displayed by a 3D display device, as illustrated in FIG. 1B, the focusing position of one single eye is located on a screen M of the 3D display device, and the sight lines of double eyes can be converged to a position of a virtual image, e.g., a position F', at a certain distance from the screen of the 3D display device due to parallax. The focusing position of one single eye is inconsistent with the converging position of the sight lines of double eyes, and thus, a viewer can generate a dizzy feeling.

A three-dimensional display device provided by embodiments of the present disclosure, as illustrated in FIG. 2A to FIG. 2D, includes: a plurality of sub pixels 1 and a plurality of grating structures 2 corresponding to each sub pixel 1 one to one; R, G and B in FIG. 2A to FIG. 2D respectively represent one sub pixel 1; FIG. 2A to FIG. 2D take a case of including the sub pixels R, G and B which respectively display red, green and blue as an example, and certainly, the three-dimensional display device provided by the embodiments of the present disclosure can also be applicable to monochromatic display, or, can also include sub pixels which display other colors, e.g., yellow (Y) and the like, which is not limited herein.

Each grating structure 2 is used for enabling light to emerge according to an assigned direction, so that emergent light of the three-dimensional display device is converged into at least two viewpoints at a left eye and converged into at least two viewpoints at a right eye; and FIG. 2A to FIG. 2D take a case that the emergent light of the three-dimensional display device is respectively converged into two viewpoints at the left eye and at the right eye as an example.

According to the three-dimensional display device provided by the embodiments of the present disclosure, the grating structures corresponding to each sub pixel one to one are arranged, and each grating structure can enable the light to emerge according to the assigned direction to enable the emergent light of the three-dimensional display device to be converged into at least two viewpoints at the left eye and converged into at least two viewpoints at the right eye, and thus, single-eye focusing three-dimensional display can be implemented, so that when a sight distance of the three-dimensional display device is designed to be equal to a sight distance of a parallax three-dimensional display, the focusing position of one single eye can be guaranteed to be consistent with the converging position of the sight lines of double eyes, and in other words, the sight lines of at least two viewpoints of the left eye and the sight lines of at least two viewpoints of the right eye are converged to the same position, thereby avoiding a case that the viewer generates the dizzy feeling when viewing the three-dimensional display device; and moreover, the three-dimensional display device provided by the embodiments of the present disclosure has the obvious advantages in the aspects of promoting quality of a display image, implementing lighting and thinning of the display device, reducing cost and the like in the Virtual Reality/Augmented Reality (VR/AR) display application.

In some examples, the three-dimensional display device provided by the embodiments of the present disclosure can be applied to a near-to-eye three-dimensional display device, i.e., a head-mounted three-dimensional display device; or, the three-dimensional display device provided by the embodiments of the present disclosure can also be applied to a far-field three-dimensional display device, i.e., the viewer views at a certain distance from the three-dimensional display device, which is not limited herein. The specific implementation modes of respectively converging the emergent light of the three-dimensional display device into at least two viewpoints at the left eye and at the right eye when the three-dimensional display device provided by the embodiments of the present disclosure is respectively applied to the above-mentioned two application forms will be illustrated in detail below.

Figure 2A:
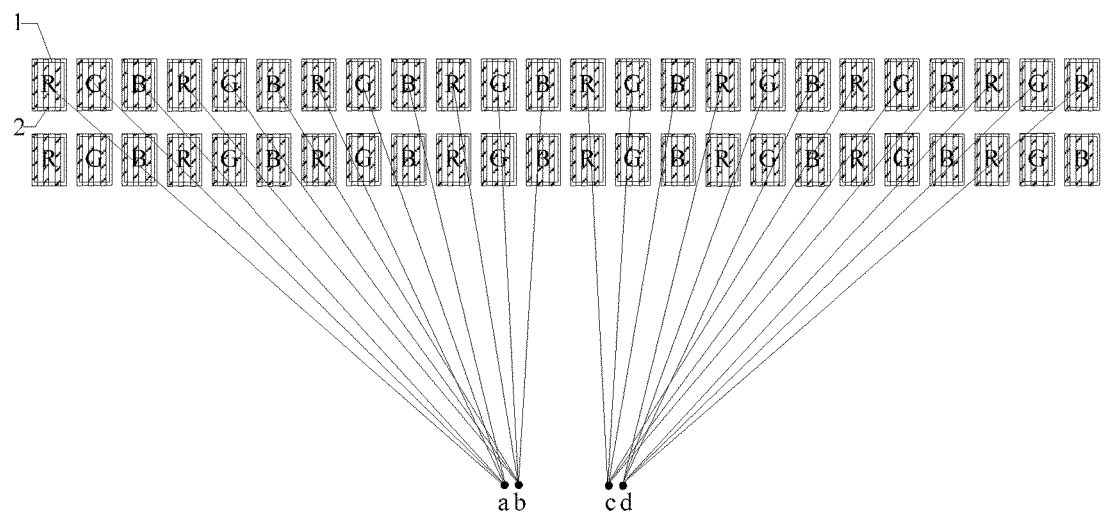
FIG. 2A is a first schematic diagram of a corresponding relationship of each grating structure and each viewpoint when a three-dimensional display device provided by embodiments of the present disclosure is applied to near-to-eye three-dimensional display.
Figure 2B:
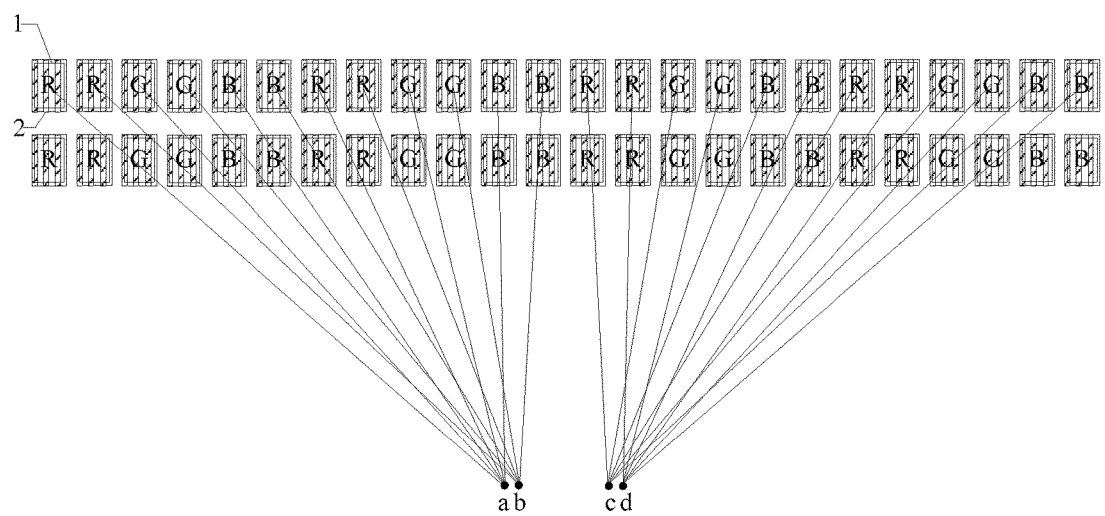
FIG. 2B is a second schematic diagram of the corresponding relationship of each grating structure and each viewpoint when the three-dimensional display device provided by the embodiments of the present disclosure is applied to near-to-eye three-dimensional display.

When the three-dimensional display device provided by the embodiments of the present disclosure is applied to the near-to-eye three-dimensional display device, as illustrated in FIG. 2A and FIG. 2B, light emerging from the left half side of the three-dimensional display device is converged into two viewpoints at the left eye, and light emerging from the left half side of the three-dimensional display device is converged into two viewpoints at the right eye. For example, in order to facilitate design of each sub pixel and the corresponding grating structure and simplicity of the solution, as illustrated in FIG. 2A, for each row of sub pixels 1 on the left half side, by taking a first row of sub pixels 1 as an example, according to a sequence from left to right, light emerging from three grating structures 2 corresponding to a first group of three adjacent sub pixels RGB is respectively converged to a viewpoint a, light emerging from three grating structures 2 corresponding to a second group of three adjacent sub pixels RGB is respectively converged to a viewpoint b, light emerging from three grating structures 2 corresponding to a third group of three adjacent sub pixels RGB is respectively converged to the viewpoint a, light emerging from three grating structures 2 corresponding to a fourth group of three adjacent sub pixels RGB is respectively converged to the viewpoint b, and so on; and for each row of sub pixels 1 on the right half side, the case is similar. Further, in order to reduce crosstalk among different colors of light and facilitate design and preparation of a color filter layer, as illustrated in FIG. 2B, for each row of sub pixels 1 on the left half side, by taking the first row of sub pixels 1 as the example, according to the sequence from left to right, light emerging from two grating structures 2 corresponding to two adjacent sub pixels RR is respectively converged to viewpoints a and b, light emerging from two grating structures 2 corresponding to two adjacent sub pixels GG is respectively converged to the viewpoints a and b, light emerging from two grating structures 2 corresponding to two adjacent sub pixels BB is respectively converged to the viewpoints a and b, and so one; and for each row of sub pixels 1 on the right half side, the case is similar.

Certainly, when the three-dimensional display device provided by the embodiments of the present disclosure is applied to the near-to-eye three-dimensional display device, the light emerging from each grating structure is converged into a plurality of viewpoints, which is not limited to forms as illustrated in FIG. 2A and FIG. 2B, and the three-dimensional display device provided by the embodiments of the present disclosure can also be applied to other convergence forms and any one of other sub pixel arrangement modes, but it can be that the light converged to each viewpoint can include three colors RGB of light, which is not limited herein.

Figure 2C:
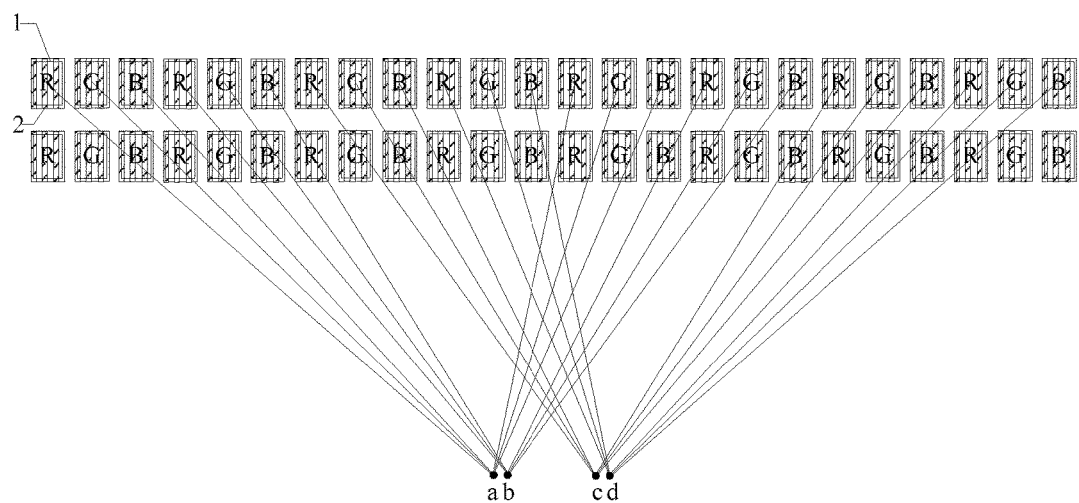
FIG. 2C is a first schematic diagram of a corresponding relationship of each grating structure and each viewpoint when the three-dimensional display device provided by the embodiments of the present disclosure is applied to far-field three-dimensional display.
Figure 2D:
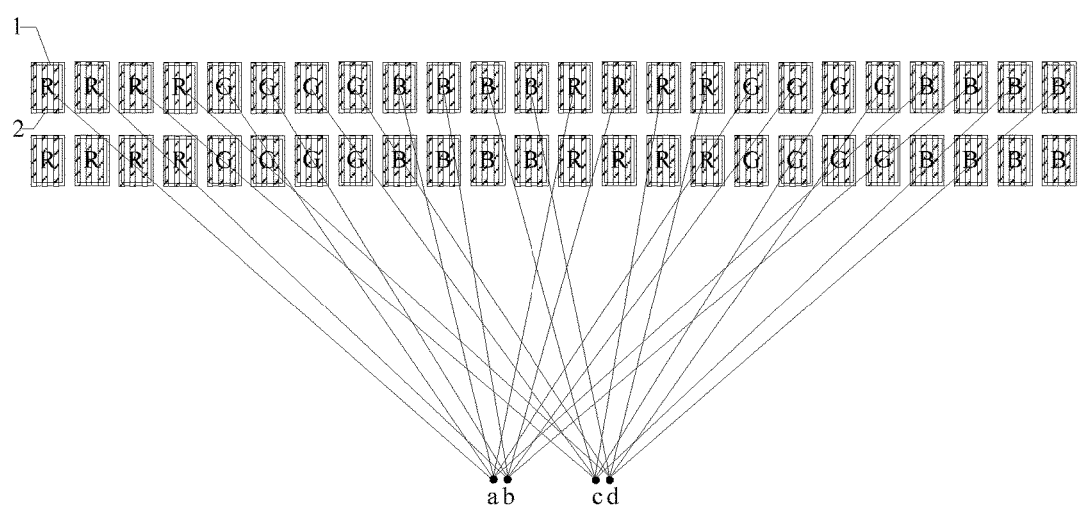
FIG. 2D is a second schematic diagram of the corresponding relationship of each grating structure and each viewpoint when the three-dimensional display device provided by the embodiments of the present disclosure is applied to far-field three-dimensional display.

When the three-dimensional display device provided by the embodiments of the present disclosure is applied to the far-field three-dimensional display, as illustrated in FIG. 2C and FIG. 2D, the emergent light of the three-dimensional display device is converged into two viewpoints at the left eye and converged into two viewpoints at the right eye. For example, in order to facilitate design of each sub pixel and the corresponding grating structure and simplicity of the solution, as illustrated in FIG. 2C, for each row of sub pixels 1, according to a sequence from left to right, the light emerging from three grating structures 2 corresponding to the first group of three adjacent sub pixels RGB is respectively converged to the viewpoint a, the light emerging from three grating structures 2 corresponding to the second group of three adjacent sub pixels RGB is respectively converged to the viewpoint b, the light emerging from three grating structures 2 corresponding to the third group of three adjacent sub pixels RGB is respectively converged to a viewpoint c, the light emerging from three grating structures 2 corresponding to the fourth group of three adjacent sub pixels RGB is respectively converged to a viewpoint d, and so on. Further, in order to reduce crosstalk among different colors of light and facilitate design and preparation of the color filter layer, as illustrated in FIG. 2D, for each row of sub pixels 1, according to the sequence from left to right, light emerging from four grating structures 2 corresponding to four adjacent sub pixels RRRR is respectively converged to the viewpoints a, b, c and d, the light emerging from four grating structures 2 corresponding to four adjacent sub pixels GGGG is respectively converged to the viewpoints a, b, c and d, the light emerging from four grating structures 2 corresponding to four adjacent sub pixels BBBB is respectively converged to the viewpoints a, b, c and d, and so one.

Certainly, when the three-dimensional display device provided by the embodiments of the present disclosure is applied to the far-field three-dimensional display device, the light emerging from each grating structure is converged into a plurality of viewpoints, which is not limited to forms as illustrated in FIG. 2C and FIG. 2D, and the three-dimensional display device provided by the embodiments of the present disclosure can also be applied to other convergence forms and any one of other sub pixel arrangement modes, but it can be that the light converged to each viewpoint can include three colors RGB of light, which is not limited herein.

Figure 3A:
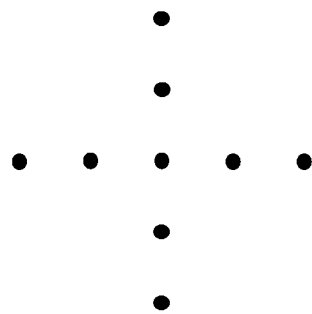
FIG. 3A is a first schematic diagram of distribution of each viewpoint into which light emerging from the three-dimensional display device provided by the embodiments of the present disclosure is converged in human eyes.
Figure 3B:
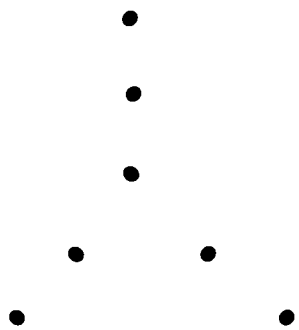
FIG. 3B is a second schematic diagram of distribution of each viewpoint into which the light emerging from the three-dimensional display device provided by the embodiments of the present disclosure is converged in the human eyes.
Figure 3C:
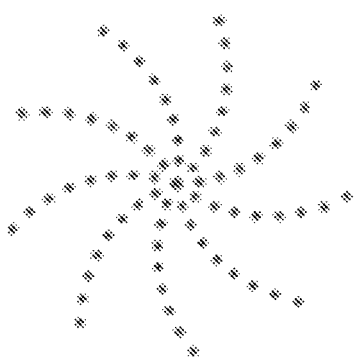
FIG. 3C is a third schematic diagram of distribution of each viewpoint into which the light emerging from the three-dimensional display device provided by the embodiments of the present disclosure is converged in the human eyes.

For example, in the three-dimensional display device provided by the embodiments of the present disclosure, the emergent light of the three-dimensional display device is respectively converged into at least two viewpoints at the left eye and at the right eye, each viewpoint converged at the left eye (or the right eye) can be distributed in a transverse and longitudinal crossing shape as illustrated in FIG. 3A, or, can also be distributed in a shape of radiating towards the surrounding from the center as illustrated in FIG. 3B, or can also be distributed in a spiral cycloid shape as illustrated in FIG. 3c, so that image quality and a field depth level degree of single-eye light field display. Certainly, arrangement of each viewpoint is not limited to the shapes illustrated in FIG. 3A to FIG. 3C, and can also adopt other arrangement modes that multiple viewpoints are in at least one direction.

In some examples, the three-dimensional display device provided by the embodiments of the present disclosure is mainly applied to a Liquid Crystal Display (LCD). Certainly, the three-dimensional display device provided by the embodiments of the present disclosure can also be applied to an Organic Electroluminescent Display (OLED), which is not limited herein. For example, when the three-dimensional display device provided by the embodiments of the present disclosure is applied to the liquid crystal display, a backlight module in the liquid crystal display can be an edge-lit backlight module, or the backlight module in the liquid crystal display can also be a direct-lit backlight module, which is not limited herein.

The specific implementation modes when the three-dimensional display device provided by the embodiments of the present disclosure is respectively applied to two structures of the liquid crystal display with the edge-lit backlight module and the liquid crystal display with the direct-lit backlight module will be illustrated in detail by two specific examples below.

Figure 4:
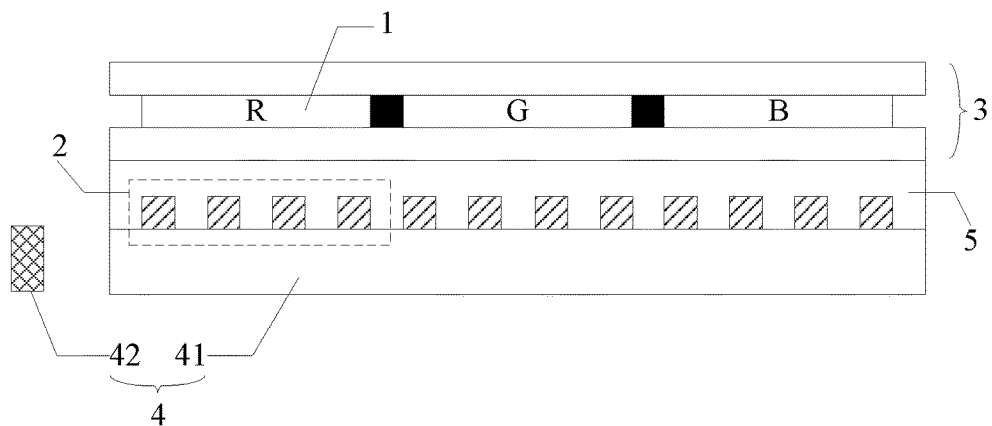
FIG. 4 is a first structural schematic diagram of the three-dimensional display device provided by the embodiments of the present disclosure.
Figure 5:
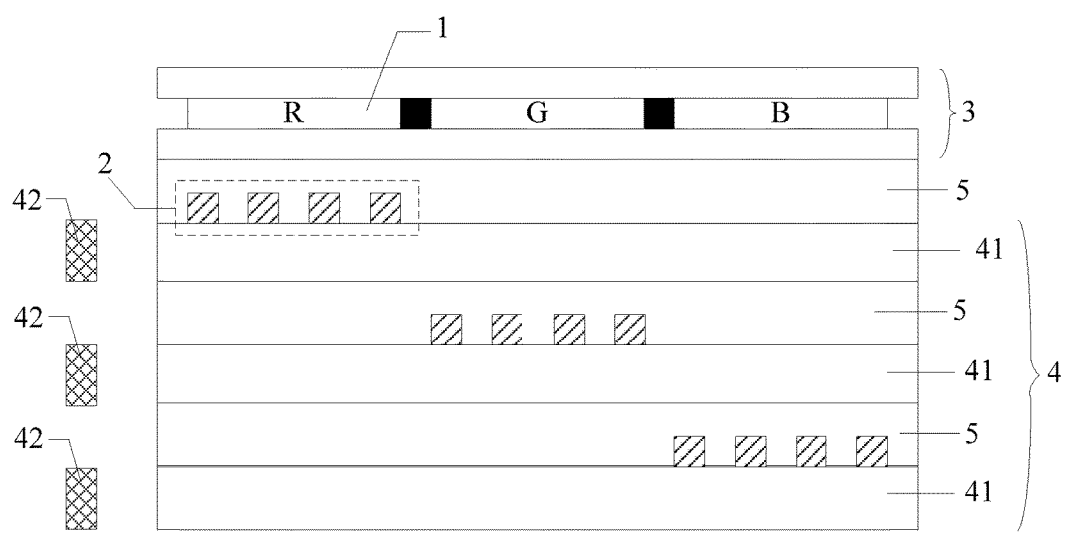
FIG. 5 is a second structural schematic diagram of the three-dimensional display device provided by the embodiments of the present disclosure.
Figure 6:
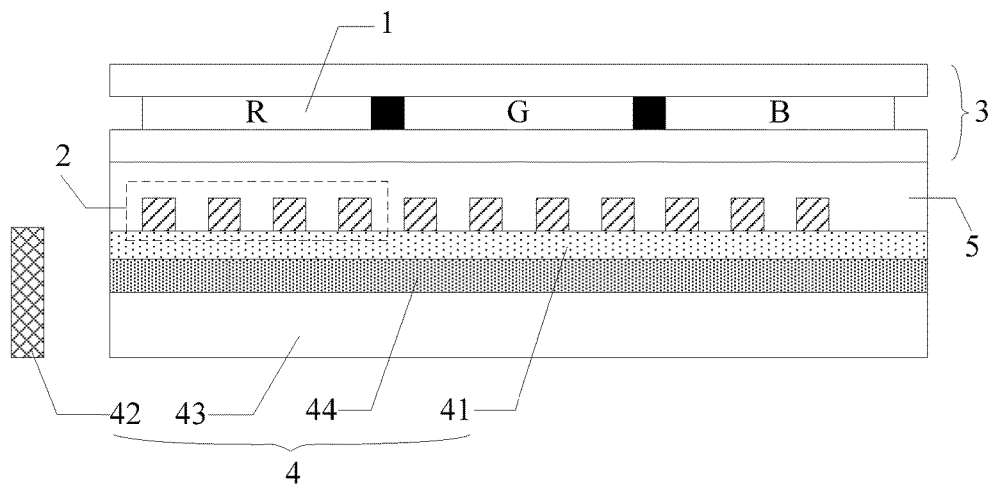
FIG. 6 is a third structural schematic diagram of the three-dimensional display device provided by the embodiments of the present disclosure.

Example I: the Three-Dimensional Display Device Provided by the Embodiments of the Present Disclosure is Applied to the Liquid Crystal Display with the Edge-Lit Backlight Module In some examples, the three-dimensional display device provided by the embodiments of the present disclosure, as illustrated in FIG. 4 to FIG. 7, can include: a liquid crystal display panel 3 and a backlight module 4 on one a side facing away from the light emergent side of the liquid crystal display panel 3, wherein the backlight module 4 can include: at least one waveguide portion 41 arranged in a laminating mode and a collimation light source 42 located at the position of a light incident surface of each waveguide portion 41; each grating structure 2 is located on a side of each waveguide portion 41, which faces the liquid crystal display panel 3; therefore, light emitted by the collimation light source 42 can be totally reflected in each waveguide portion 41, is scattered out from each grating structure 2, and is converged into at least two viewpoints at the left eye and converged into at least two viewpoints at the right eye so as to implement single-eye focusing three-dimensional display. FIG. 4 and FIG. 6 take a case that the backlight module 4 includes one waveguide portion 41 as an example, and FIG. 5 and FIG. 7 take a case that the backlight module 4 includes three waveguide portions 41 as an example.

In some examples, in the three-dimensional display device provided by the embodiments of the present disclosure, as illustrated in FIG. 4 and FIG. 5, each waveguide portion 41 can be a first substrate with a waveguide function. For example, the first substrate with the waveguide function can be made of a material with a high refractive index, e.g., a glass or resin material of which a refractive index is in a range of 1.6 to 2, so as to ensure that the light emitted by the collimation light source can be totally reflected in the first substrate. For example, a thickness of the first substrate can be controlled in a range of 0.1 mm to 2 mm.

In some examples, in the three-dimensional display device provided by the embodiments of the present disclosure, as illustrated in FIG. 4, the number of the first substrate can be one, at the moment, the collimation light source 42 located at the position of the light incident surface of the first substrate can emit white light, and each grating structure 2 is located on a side of the first substrate, which faces the liquid crystal display panel 3, and thus, the light emitted by the collimation light source 42 can be totally reflected in the first substrate, is scattered out from each grating structure 2 and is converged into at least two viewpoints at the left eye and converged into at least two viewpoints at the right eye, so that single-eye focusing three-dimensional display is implemented.

In some examples, in the three-dimensional display device provided by the embodiments of the present disclosure, in order to reduce crosstalk among different colors of light, as illustrated in FIG. 5, the number of the first substrates can be three, at the moment, the collimation light sources 42 located at the positions of the light incident surfaces of different first substrates can respectively emit different colors of light, and for example, as illustrated in FIG. 5, according to a direction facing away from the light emergent side of the liquid crystal display panel 3, the collimation light source 42 located at the position of the light incident surface of the first one of the first substrates can emit red (R) light, the collimation light source 42 located at the position of the light incident surface of the second one of the first substrates can emit green (G) light, and the collimation light source 42 located at the position of the light incident surface of the third one of the first substrates can emit blue (B) light; and each grating structure 2 is located on a side of the first substrate irradiated by the collimation light source 42 with the same color with the corresponding sub pixel 1, which faces the liquid crystal display panel 3, and for example, as illustrated in FIG. 5, each grating structure 2 corresponding to each sub pixel R is located on a side of the first substrate (i.e., the first one of the first substrates) irradiated by the collimation light source 42 emitting the red (R) light, which faces the liquid crystal display panel 3, and the red (R) light emitted by the collimation light source 42 is totally reflected in the first one of the first substrates and is scattered out from each grating structure 2 on the first one of the first substrates, similarly, each grating structure 2 corresponding to each sub pixel G is located on a side of the first substrate (i.e., the second one of the first substrates) irradiated by the collimation light source 42 emitting the green (G) light, which faces the liquid crystal display panel 3, and the green (G) light emitted by the collimation light source 42 is totally reflected in the second one of the first substrates and is scattered out from each grating structure 2 on the second one of the first substrates, and similarly, each grating structure 2 corresponding to each sub pixel B is located on a side of the first substrate (i.e., the third one of the first substrates) irradiated by the collimation light source 42 emitting the blue (B) light, which faces the liquid crystal display panel 3, and the blue (B) light emitted by the collimation light source 42 is totally reflected in the third one of the first substrates and is scattered out from each grating structure 2 on the third one of the first substrates, so that the light is converged into at least two viewpoints at the left eye and converged into at least two viewpoints at the right eye, and single-eye focusing three-dimensional display is implemented.

It should be noted that in the three-dimensional display device, as illustrated in FIG. 5, provided by the embodiments of the present disclosure, the collimation light sources are all monochromatic light sources, and thus, arrangement of the color filter layer can be omitted in the liquid crystal display panel, so that not only can a production process be simplified, but also light emergent efficiency of the liquid crystal display panel can be improved.

In some examples, in the three-dimensional display device provided by the embodiments of the present disclosure, the grating structure can be directly produced on a surface of the first surface, which faces the liquid crystal display panel, or the grating structure can also be produced on other substrates and then is adhered to one surface of the first substrate, which faces the liquid crystal display panel, which is not limited herein. A gap in each grating structure can be air, or can also be filled with a material of which a refractive index is obviously different from the first substrate, which is not limited herein.

In some examples, in the three-dimensional display device provided by the embodiments of the present disclosure, a material of the grating structure needs to be a transparent material, e.g., silicon dioxide ($SiO_2$), a resin material and the like; the refractive index of the grating structure needs to be obviously different from that of a surrounding medium; and a duty ratio of the grating structure can be controlled in a range of 0.1 to 0.9, for example, the duty ratio of the grating structure can be 0.5, and particularly, the duty ratio can be designed by comprehensively considering factors of intensity of the emergent light, differences in display brightness of the three-dimensional display device at different positions, process conditions and the like, which is not limited herein.

For example, in the three-dimensional display device provided by the embodiments of the present disclosure, in order to improve the light emergent efficiency, the thickness of each grating structure can be controlled in a range of 100 nm to 700 nm. Preferably, the thickness of each grating structure can be set as 200 nm. For example, the thickness of the grating structure corresponding to the sub pixel R, the thickness of the grating structure corresponding to the sub pixel G and the thickness of the grating structure corresponding to the sub pixel B can be set to be equal; or, the thickness of the grating structure corresponding to the sub pixel R, the thickness of the grating structure corresponding to the sub pixel G and the thickness of the grating structure corresponding to the sub pixel B can also be respectively designed, which is not limited herein.

Figure 7:
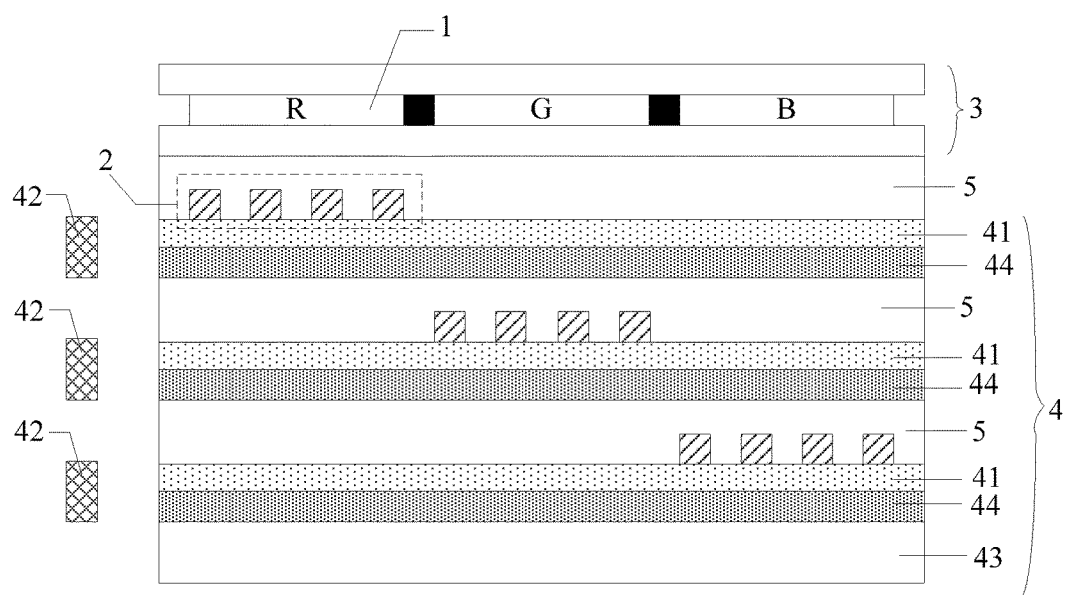
FIG. 7 is a fourth structural schematic diagram of the three-dimensional display device provided by the embodiments of the present disclosure.

In some examples, in the three-dimensional display device provided by the embodiments of the present disclosure, as illustrated in FIG. 6 and FIG. 7, each waveguide portion 41 can be a waveguide layer; the backlight module 4 can further include: a second substrate 43 located on a side of the waveguide layer at the maximum distance from (farthest from) the liquid crystal display panel 3, which faces away from the liquid crystal display panel 3; and the second substrate 43 can be made of a material of which a refractive index is smaller than that of the waveguide layer so as to ensure that the light emitted by the collimation light source 42 can be totally reflected in the waveguide layer.

In some examples, in the three-dimensional display device provided by the embodiments of the present disclosure, as illustrated in FIG. 6, the number of the waveguide layer can be one, in this case, the collimation light source 42 located at the position of the light incident surface of the waveguide layer can emit white light, and each grating structure 2 is located on a side of the waveguide layer, which faces the liquid crystal display panel 3, and thus, the light emitted by the collimation light source 42 can be totally reflected in the waveguide layer, is scattered out from each grating structure 2 and is converged into at least two viewpoints at the left eye and converged into at least two viewpoints at the right eye, so that single-eye focusing three-dimensional display is implemented.

In some examples, in the three-dimensional display device provided by the embodiments of the present disclosure, in order to reduce crosstalk among different colors of light, as illustrated in FIG. 7, the number of the waveguide layers can be three, in this case, the collimation light sources 42 located at the positions of the light incident surfaces of different waveguide layers respectively emit different colors of light, and for example, as illustrated in FIG. 7, according to the direction facing away from the light emergent side of the liquid crystal display panel 3, the collimation light source 42 located at the position of the light incident surface of a first waveguide layer can emit red (R) light, the collimation light source 42 located at the position of the light incident surface of a second waveguide layer can emit green (G) light, and the collimation light source 42 located at the position of the light incident surface of a third waveguide layer can emit blue (B) light; and each grating structure 2 is located on a side of the waveguide layer irradiated by the collimation light source 42 with the same color with the corresponding sub pixel 1, which faces the liquid crystal display panel 3, and for example, as illustrated in FIG. 7, each grating structure 2 corresponding to each sub pixel R is located on a side of the waveguide layer (i.e., the first waveguide layer) irradiated by the collimation light source 42 emitting the red (R) light, which faces the liquid crystal display panel 3, and the red (R) light emitted by the collimation light source 42 is totally reflected in the first waveguide layer and is scattered out from each grating structure 2 on the first waveguide layer, similarly, each grating structure 2 corresponding to each sub pixel G is located on a side of the waveguide layer (i.e., the second waveguide layer) irradiated by the collimation light source 42 emitting the green (G) light, which faces the liquid crystal display panel 3, and the green (G) light emitted by the collimation light source 42 is totally reflected in the second waveguide layer and is scattered out from each grating structure 2 on the second waveguide layer, and similarly, each grating structure 2 corresponding to each sub pixel B is located on a side of the waveguide layer (i.e., the third waveguide layer) irradiated by the collimation light source 42 emitting the blue (B) light, which faces the liquid crystal display panel 3, and the blue (B) light emitted by the collimation light source 42 is totally reflected in the third waveguide layer and is scattered out from each grating structure 2 on the third waveguide layer, so that the light is converged into at least two viewpoints at the left eye and converged into at least two viewpoints at the right eye, and single-eye focusing three-dimensional display is implemented.

It should be noted that in the three-dimensional display device, as illustrated in FIG. 7, provided by the embodiments of the present disclosure, the collimation light sources are all monochromatic light sources, and thus, arrangement of the color filter layer can be omitted in the liquid crystal display panel, so that not only can the production process be simplified, but also the light emergent efficiency of the liquid crystal display panel can be improved.

In the specific implementation, in the three-dimensional display device provided by the embodiments of the present disclosure, in order to improve uniformity of the waveguide layer, as illustrated in FIG. 6 and FIG. 7, the backlight module 4 can further include: a buffer layer 44 located on a side of each waveguide layer, which faces the second substrate 43. For example, a material of the buffer layer needs to be a transparent material, e.g., the silicon dioxide ($SiO_2$), the resin material and the like, a refractive index of the buffer layer needs to be smaller than that of the waveguide layer. In the three-dimensional display device as illustrated in FIG. 6, a thickness of the buffer layer can be controlled in a range of hundreds of nanometers to several microns, and in the three-dimensional display device as illustrated in FIG. 7, an equivalent optical thickness (i.e., a product of the refractive index and an actual thickness) of the buffer layer, for example, is at least greater than 1 μm.

For example, in the three-dimensional display device provided by the embodiments of the present disclosure, the refractive index of the waveguide layer needs to be greater than that of each layer (for example, the buffer layer or the second substrate, except for the grating structure) adjacent to the waveguide layer, the material of the waveguide layer can select a transparent material of which a refractive index is in a range of 1.7 to 2, e.g., silicon nitride ($Si_3N_4$), so as to ensure that the light emitted by the collimation light source can be totally reflected in the waveguide layer.

For example, in the three-dimensional display device provided by the embodiments of the present disclosure, in order to facilitate control of each grating structure on a direction and a color of the light emergent light, the thickness of the waveguide layer can be controlled in a range of 100 nm to 100 μm preferably. Certainly, when collimation of the collimation light source is good, the requirement for the thickness of the waveguide layer can be relaxed properly, and the thickness of the waveguide layer can be controlled in a range of hundreds of nanometers to several millimeters.

In some examples, in the three-dimensional display device provided by the embodiments of the present disclosure, the grating structure can be directly produced on a surface of the waveguide layer, which faces the liquid crystal display panel, and the gap in each grating structure can be air, or can also be filled with a material of which a refractive index is obviously different from that of the waveguide layer, which is not limited herein.

In some examples, in the three-dimensional display device provided by the embodiments of the present disclosure, the material of the grating structure needs to be a transparent material, e.g., silicon dioxide ($SiO_2$), resin material and the like; the refractive index of the grating structure can be obviously different from that of the surrounding medium; and the duty ratio of the grating structure can be controlled in a range of 0.1 to 0.9, for example, the duty ratio of the grating structure can be 0.5, and particularly, the duty ratio can be designed by comprehensively considering factors of intensity of the emergent light, differences in display brightness of the three-dimensional display device at different positions, process conditions and the like, which is not limited herein.

For example, in the three-dimensional display device provided by the embodiments of the present disclosure, in order to improve the light emergent efficiency, the thickness of each grating structure can be controlled in a range of 100 nm to 500 nm preferably. Preferably, the thickness of each grating structure can be set as 200 nm. For example, the thickness of the grating structure corresponding to the sub pixel R, the thickness of the grating structure corresponding to the sub pixel G and the thickness of the grating structure corresponding to the sub pixel B can be set to be equal; or, the thickness of the grating structure corresponding to the sub pixel R, the thickness of the grating structure corresponding to the sub pixel G and the thickness of the grating structure corresponding to the sub pixel B can also be respectively designed, which is not limited herein.

It should be noted that in the three-dimensional display device provided by the embodiments of the present disclosure, it can be seen by comparing the structures as illustrated in FIG. 6 and FIG. 7 and the structures as illustrated in FIG. 4 and FIG. 5, the light emitted by the collimation light source and coupled into the waveguide layer is less than that coupled into the first substrate, because the thickness of the waveguide layer is smaller than that of the first substrate with the waveguide function, and thus, the three-dimensional display device as illustrated in FIG. 4 and FIG. 5 is relatively high in light emergent efficiency.

In some examples, in the three-dimensional display device provided by the embodiments of the present disclosure, the collimation light source can be prepared from an RGB trichromatic semiconductor laser chip via light mixing, or can also be prepared from an RGB trichromatic Light Emitting Diode (LED) chip with good collimation via light mixing, or, can also be prepared from a white light LED chip with good collimation, or can also be prepared from a strip Cold Cathode Fluorescent Lamp (CCFL) and a collimation structure, which is not limited herein. In order to ensure that the light emitted by the collimation light source can be totally reflected in the first substrate with the waveguide function or the waveguide layer and enable a waveguide grating to have proper light emergent efficiency, the collimation light source needs to inject light into the first substrate or the waveguide layer at a certain incident angle. Moreover, in order to enable the collimation light source to be matched with the liquid crystal display panel in width, the semiconductor laser chip or the LED chip consistent with the liquid crystal display panel in width can be used, or optical structures for beam expansion, collimation and the like can also be arranged in the front of the semiconductor laser chip or the LED chip with a small density, which is not limited herein. Moreover, the light emitted by the collimation light source can be aligned with the first substrate with the waveguide function or the waveguide layer, and it is proper that the collimation light source covers the first substrate or the waveguide layer to the greatest extent and does not emit light to the liquid crystal display panel.

It should be noted that in the three-dimensional display device provided by the embodiments of the present disclosure, each grating structure needs to be accurately aligned with the corresponding sub pixel, a direction of the light emerging from each grating structure is mostly not perpendicular to the liquid crystal display panel, and a certain distance exists between a film layer where each grating structure is located and the color filter layer in the liquid crystal display panel, and thus, when the position of each grating structure is designed, stagger between each grating structure and the color filter layer corresponding to the corresponding sub pixel may be considered.

In some examples, in the three-dimensional display device provided by the embodiments of the present disclosure, as illustrated in FIG. 4 to FIG. 7, adhesion can be carried out between the liquid crystal display panel 3 and the backlight module 4 and between each waveguide portion 41 by utilizing an Optically Clear Adhesive (OCA). For example, the light emergent side of the liquid crystal display panel can be the side of a color filter substrate, and in this case, an array substrate on which the sub pixels are formed can be adhered to the backlight module; or, the light emergent side of the liquid crystal display panel can also be the side of the array substrate, and in this case, the color filter substrate on which the color filter layer is formed can be adhered to the backlight module, which is not limited herein.

A specific principle that the three-dimensional display device provided by the embodiments of the present disclosure utilizes the waveguide grating to implement convergence of at least two viewpoints at the left eye and convergence of at least two viewpoints at the right eye will be illustrated in detail below. The waveguide grating in the three-dimensional display device meets a formula that: $\beta_q = \beta_m - qK$, wherein upon $q=0, \pm 1, \pm 2, \ldots$, an m-order guided mode can be coupled out according to an assigned direction, so that at least two viewpoints can be converged at the left eye, at least two viewpoints can be converged at the right eye, and single-eye focusing three-dimensional display is implemented. In the formula, $\beta_m$ represents a propagation constant of the m-order guided mode, and $\beta_m = k_0 N_m$, wherein $k_0$ represents a wave vector, $$k_0 = \frac{2\pi}{\lambda},$$

Figure 8:
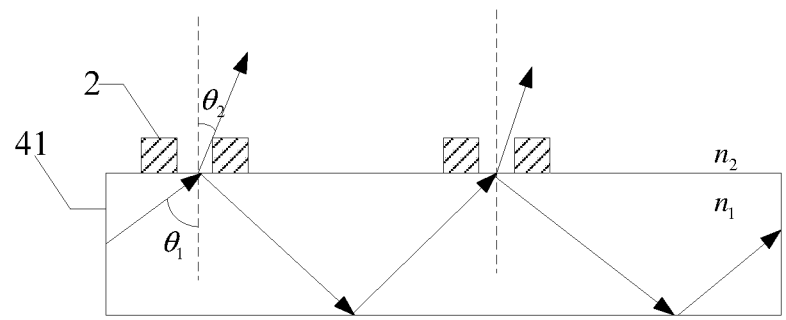
FIG. 8 is a schematic diagram of an optical path of a waveguide grating in the three-dimensional display device provided by the embodiments of the present disclosure.

$\lambda$ represents a wavelength of the emergent light, $N_m$ represents an effective refractive index of the m-order guided mode, $N_m \approx n_1 \sin \theta_1$, as illustrated in FIG. 8, $n_1$ represents a refractive index of the waveguide portion 41, and $\theta_1$ represents a reflection angle for the light to be totally reflected in the waveguide portion; $\beta_q$ represents a propagation constant of a q-order diffracted wave, $\beta_q = k_0 n_2 \sin \theta_2$, as illustrated in FIG. 8, $n_2$ represents a refractive index of the air, and $\theta_2$ represents an emergent angle of light emerging into the air; K represents a grating vector, $$K = \frac{2\pi}{\Lambda},$$

and $\Lambda$ represents a grating period; therefore, the above-mentioned formula can be represented with $$k_0 n_2 \sin\theta_2 = k_0 n_1 \sin\theta_1 - q\frac{2\pi}{\Lambda},$$

where $$k_0 = \frac{2\pi}{\lambda},$$

and it can be known from the formula that the wavelength of the emergent light $\lambda$, the emergent angle $\theta_2$ of the emergent light and the grating period $\Lambda$ of the grating structure are associated, and thus, the grating period $\Lambda$ of each grating structure can be designed according to the wavelength $\lambda$ (the wavelength corresponds to the color displayed by the sub pixel, and for example, a wavelength range of the light emerging from the grating structure corresponding to the sub pixel R is 622 nm to 770 nm, a wavelength range of the light emerging from the grating structure corresponding to the sub pixel G is 492 nm to 577 nm, and a wavelength range of the light emerging from the grating structure corresponding to the sub pixel B is 455 nm to 492 nm) and the emergent angle $\theta_2$ of the light emerging from each grating structure, so that the emergent light can emerge according to the assigned direction and is converged into at least two viewpoints at the left eye and converged into at least two viewpoints at the right eye.

It should be noted that the emergent angle $\theta_2$ is an emergent angle of light emerging into the air, and a propagation direction of the light when the light passes through the liquid crystal display panel is changed a little, and thus, the emergent angle $\theta_2$ can be regarded as the emergent angle of the emergent light emerging from the three-dimensional display device.

Figure 9:
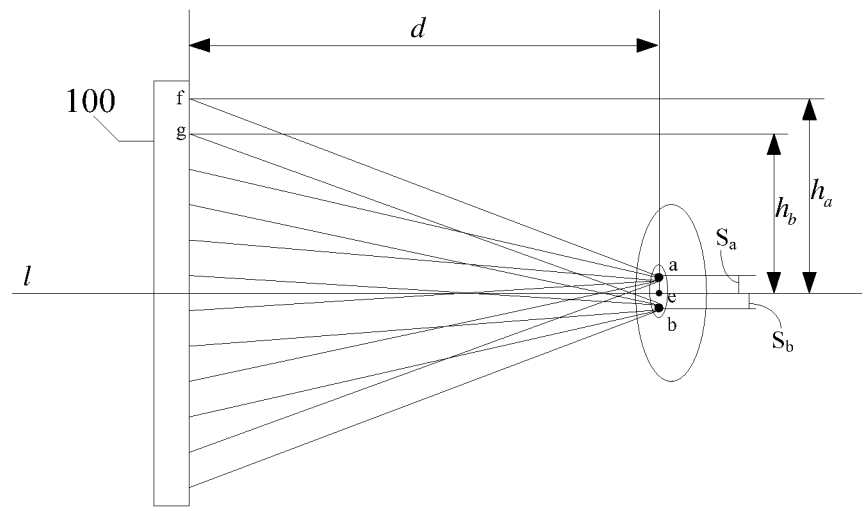
FIG. 9 is a schematic diagram that the grating structures at different positions in the three-dimensional display device provided by the embodiments of the present disclosure are converged into two viewpoints in human eyes.

Determination on the emergent angle $\theta_2$ of the light emerging from each grating structure of the three-dimensional display device provided by the embodiments of the present disclosure will be illustrated in detail below. As illustrated in FIG. 9, the emergent light of the three-dimensional display device 100 is converged into two viewpoints a and b (FIG. 9 takes a case that the a and the b are respectively located above and below a perpendicular line l from a pupil center e to the three-dimensional display device as an example) at a pupil of a human eye, a distance from the pupil center e to the three-dimensional display device 100 is d (a range of d can be 10 mm to 100 mm), and distances from two viewpoints a and b to the pupil center e respectively are $S_a$ and $S_b$ (a range of $S_a$ can be 0.5 mm to 1.25 mm, and a range of $S_b$ can be 0.5 mm to 1.25 mm). By respectively taking the grating structure at a position f and the grating structure at a position g as examples below, light emerging from the grating structure at the position f is converged into the viewpoint a, a distance from the center of the grating structure at the position f to the perpendicular line l is $h_a$, an angle between the light emerging from the grating structure at the position f and the perpendicular line l is the emergent angle $\theta_2$ of the light emerging from the grating structure at the position f, and according to a tangent function, the light emerging from the grating structure at the position f meets that $$\tan\theta_2 = \frac{h_a - S_a}{d},$$

and then the emergent angle of the light emerging from the grating structure at the position f is that $$\theta_2 = \arctan\frac{h_a - S_a}{d};$$

and light emerging from the grating structure at the position g is converged into the viewpoint b, a distance from the center of the grating structure at the position g to the perpendicular line l is $h_b$, an angle between the light emerging from the grating structure at the position g and the perpendicular line l is the emergent angle $\theta_2$ of the light emerging from the grating structure at the position g, and according to the tangent function, the light emerging from the grating structure at the position g meets that $$\tan\theta_2 = \frac{h_d + S_b}{d},$$

and then the emergent angle of the light emerging from the grating structure at the position g is that $$\theta_2 = \arctan\frac{h_d + S_b}{d}.$$

After the emergent angle $\theta_2$ of the light emerging from each grating structure is determined, the grating period Λ of each grating structure can be designed according to the emergent angle $\theta_2$ and the wavelength λ of the light emerging from each grating structure, so that the light emerging from the three-dimensional display device is converged into at least two viewpoints at the left eye and converged into at least two viewpoints at the right eye.

Figure 10:
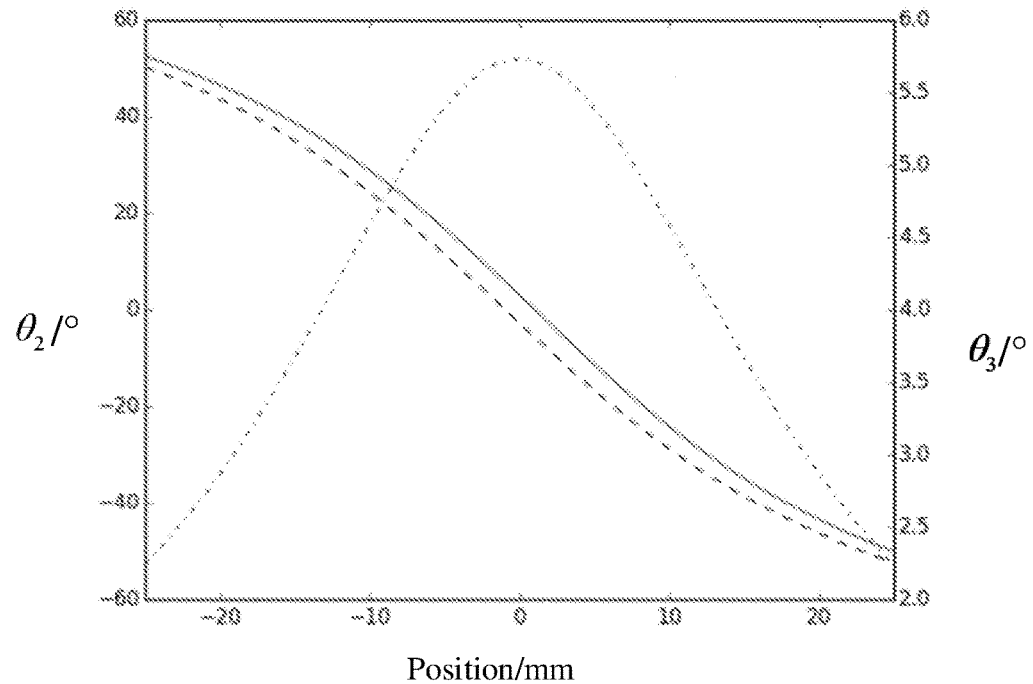
FIG. 10 is a curve chart of variations of an emergent angle of emergent light of the three-dimensional display device provided by the embodiments of the present disclosure along positions of the grating structures.

For example, FIG. 10 is a curve chart of variations of the emergent angle $\theta_2$ of the emergent light along positions of the grating structures, the abscissa represents a position of each grating structure in the three-dimensional display device, a left ordinate represents the emergent angle $\theta_2$ of the emergent light, a right ordinate represents an emergent angle difference $\theta_3$ of the emergent light corresponding to the viewpoints a and b, a solid line in FIG. 10 represents a curve of variations of the emergent angle $\theta_2$ of the emergent light corresponding to the viewpoint a along the positions of the grating structures, a long dotted line represents a curve of variations of the emergent angle $\theta_2$ of the emergent light corresponding to the viewpoint b along the positions of the grating structures, and a short dotted line represents a difference between the solid line and the long dotted line.

Example II: The Three-Dimensional Display Device Provided by the Embodiments of the Present Disclosure is Applied to the Liquid Crystal Display with the Direct-Lit Backlight Module In some examples, the three-dimensional display device provided by the embodiments of the present disclosure, as illustrated in FIG. 11 and FIG. 12, can include: a liquid crystal display panel 3 and a backlight module 4 on a side facing away from a light emergent side of the liquid crystal display panel 3, wherein the backlight module 4 is direct-lit collimation backlight; as illustrated in FIG. 11, each grating structure 2 can be located between the backlight module 4 and the liquid crystal display panel 3; or, as illustrated in FIG. 12, each grating structure 2 can also be located on the light emergent side of the liquid crystal display panel 3; or, each grating structure can also be located inside the liquid crystal display panel, e.g., on the upper surface or the lower surface of the color filter layer, which is not limited herein.

For example, in the three-dimensional display device provided by the embodiments of the present disclosure, when each grating structure is located between the backlight module and the liquid crystal display panel, each grating structure can be directly produced on a substrate on a side in the liquid crystal display panel, which faces the backlight module; or, each grating structure can also be produced on other substrates and then adhered to the substrate on a side in the liquid crystal display panel, which faces the backlight module; or, each grating structure can also be produced or adhered onto a substrate on a side of the direct-lit backlight module, which faces the liquid crystal display panel, which is not limited herein.

For example, in the three-dimensional display device provided by the embodiments of the present disclosure, when each grating structure is located on the light emergent side of the liquid crystal display panel, each grating structure can be directly produced on a substrate on the light emergent side of the liquid crystal display panel; or, each grating structure can also be produced on other substrates and then adhered to the substrate on the light emergent side of the liquid crystal display panel, which is not limited herein.

Figure 11:
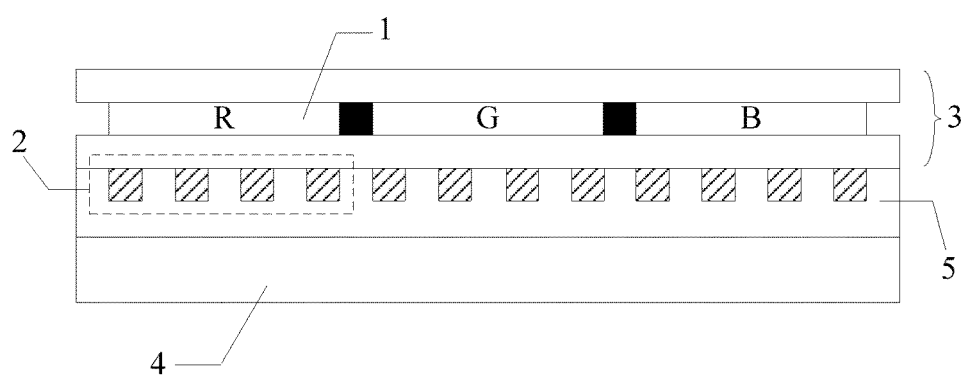
FIG. 11 is a fifth structural schematic diagram of the three-dimensional display device provided by the embodiments of the present disclosure.
Figure 12:
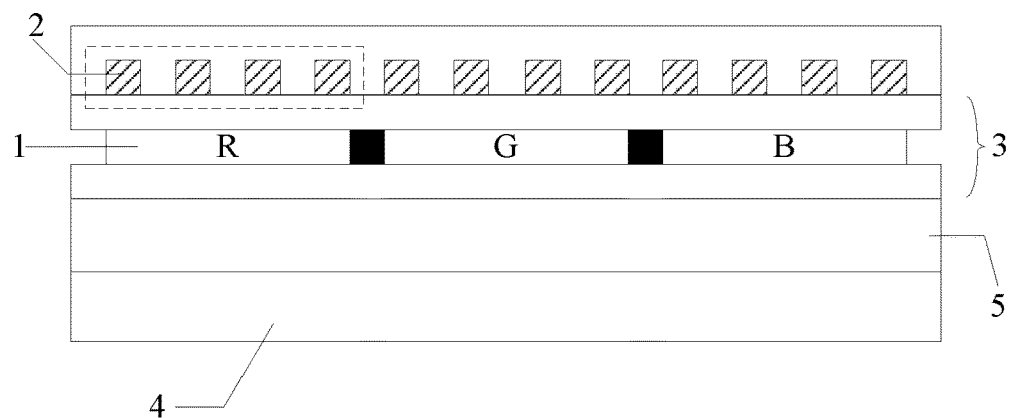
FIG. 12 is a sixth structural schematic diagram of the three-dimensional display device provided by the embodiments of the present disclosure.

In some examples, in the three-dimensional display device provided by the embodiments of the present disclosure, as illustrated in FIG. 11 and FIG. 12, adhesion can be carried out between the liquid crystal display panel 3 and the backlight module 4 by utilizing an optically clear adhesive 5. For example, the light emergent side of the liquid crystal display panel can be the side of a color filter substrate, and in this case, an array substrate on which the sub pixels are formed can be adhered to the backlight module; or, the light emergent side of the liquid crystal display panel can also be the side of the array substrate, and in this case, the color filter substrate on which the color filter layer is formed can be adhered to the backlight module, which is not limited herein.

In some examples, in the three-dimensional display device provided by the embodiments of the present disclosure, if light emitted by the backlight module is perpendicularly incident to the liquid crystal display panel, a long grating period of each grating structure will be needed, resulting in that regulation accuracy of a light emergent direction of the emergent light is relatively low. For example, in the three-dimensional display device provided by the embodiments of the present disclosure, an angle between the light emitted by the backlight module and a plane where the liquid crystal display panel is located can be controlled in a range of 40 degrees to 80 degrees. Preferably, the angle between the light emitted by the backlight module and the plane where the liquid crystal display panel is located can be set as 60 degrees. For example, the angle between the light emitted by the backlight module and the plane where the liquid crystal display panel is located can be designed by comprehensively considering factors of a viewing angle range, a distance from the three-dimensional display device to the human eye, the regulation accuracy of the light emergent direction of the emergent light and the like.

It should be noted that in the three-dimensional display device provided by the embodiments of the present disclosure, each grating structure can be accurately aligned with the corresponding sub-pixel, and due to cases that light emerging from the direct-lit backlight is incident to the liquid crystal display panel at a certain inclination angle and moreover, a certain distance exists between the film layer where each grating structure is located and the color filter layer in the liquid crystal display panel, when the position of each grating structure is designed, stagger between each grating structure and the color filter layer corresponding to the corresponding sub pixel may be considered.

In some examples, in the three-dimensional display device provided by the embodiments of the present disclosure, the direct-lit collimation backlight can be prepared from an RGB trichromatic semiconductor laser chip via beam expansion, light mixing and collimation, or can also be prepared from an RGB trichromatic Light Emitting Diode (LED) chip with good collimation via beam expansion, light mixing and collimation, or can also be prepared from a white light LED chip with good collimation via beam expansion and collimation, or can also be prepared from a strip Cold Cathode Fluorescent Lamp (CCFL) and optical structures for collimation, beam expansion and the like, which is not limited herein. Moreover, the direct-lit collimation backlight can be adhered to the liquid crystal display panel, or can also be separately arranged, which is not limited herein.

In some examples, in the three-dimensional display device provided by the embodiments of the present disclosure, a material of the grating structure needs to be a transparent material, e.g., silicon dioxide ($SiO_2$), a resin material and the like; the refractive index of the grating structure can be obviously different from that of a surrounding medium; and a duty ratio of the grating structure can be controlled in a range of 0.1 to 0.9, for example, the duty ratio of the grating structure can be 0.5, and the duty ratio can be designed by comprehensively considering factors of intensity of the emergent light, differences in display brightness of the three-dimensional display device at different positions, process conditions and the like, which is not limited herein.

For example, in the three-dimensional display device provided by the embodiments of the present disclosure, in order to improve the light emergent efficiency, the thickness of each grating structure can be controlled in a range of 100 nm to 700 nm. For example, the thickness of each grating structure can be set as 200 nm. For example, the thickness of the grating structure corresponding to the sub pixel R, the thickness of the grating structure corresponding to the sub pixel G and the thickness of the grating structure corresponding to the sub pixel B can be set to be equal; or, the thickness of the grating structure corresponding to the sub pixel R, the thickness of the grating structure corresponding to the sub pixel G and the thickness of the grating structure corresponding to the sub pixel B can also be respectively designed, which is not limited herein.

Figure 13:
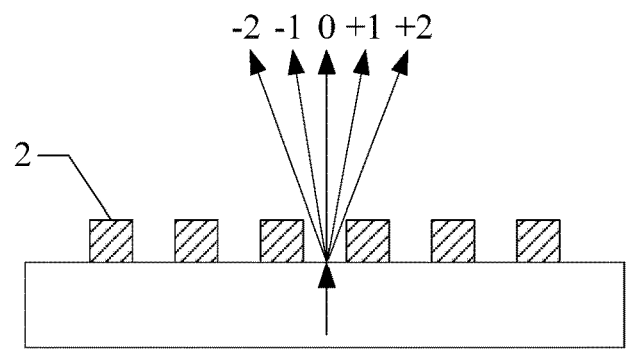
FIG. 13 is a schematic diagram of an optical path of the grating structure in the three-dimensional display device provided by the embodiments of the present disclosure.

A specific principle that the three-dimensional display device provided by the embodiments of the present disclosure implements convergence of at least two viewpoints at the left eye and convergence of at least two viewpoints at the right eye will be illustrated in detail below. A diffraction angle θ of an m-level diffraction wave of the grating structure is decided by a grating period P, a wavelength λ of incident light and an incident angle $θ_0$, and meets a formula that $\sin θ - \sin θ_0 = mλ/P$, wherein m=0, ±1, ±2, . . . (as illustrated in FIG. 13). Diffraction intensity of 0-level diffraction and 1-level diffraction of the grating structure is relatively high, diffraction intensity of a high-order diffraction level is much smaller, moreover, a propagation direction of a 0-level diffraction wave is fixed and along a direction of the incident light, and a diffraction direction of a 1-level diffraction wave can be regulated and controlled by the grating period, and thus, the three-dimensional display device provided by the embodiments of the present disclosure selects the 1-level diffraction wave to implement regulation on the emergent angle of the emergent light, i.e., meet that $\sin θ - \sin θ_0 = λ/P$, wherein θ represents the emergent angle of the emergent light, $θ_0$ represents the incident angle of the incident light, λ represents the wavelength of the incident light, and P represents the grating period; the incident angle $θ_0$ of the incident light (i.e., the emergent angle of the emergent light of the direct-lit backlight module) is fixed, and the wavelength λ of the incident light, the emergent angle θ of the emergent light and the grating period of the grating structure are associated, and thus, the grating period P of each grating structure can be designed according to a wavelength (the wavelength is equal to the wavelength λ of the incident light and corresponds to the color displayed by the sub pixel, and for example, a wavelength range of the light emerging from the grating structure corresponding to the sub pixel R is 622 nm to 770 nm, a wavelength range of the light emerging from the grating structure corresponding to the sub pixel G is 492 nm to 577 nm, and a wavelength range of the light emerging from the grating structure corresponding to the sub pixel B is 455 nm to 492 nm) and the emergent angle θ of the light emerging from each grating structure, so that the emergent light can emerge according to the assigned direction and is converged into at least two viewpoints at the left eye and converged into at least two viewpoints at the right eye.

Moreover, when a grid and gap equivalent optical path difference of the incident light at the grating structure is odd number times of a half wavelength, the 0-level diffraction wave is subjected to coherent subtraction, the diffraction intensity of the 0-level diffraction wave is weakened, and the diffraction intensity of the 1-level diffraction wave is reinforced, and when the grid and gap equivalent optical path difference of the incident light at the grating structure is even number times of the half wavelength, the 1-level diffraction wave is subjected to coherent subtraction, the diffraction intensity of the 1-level diffraction wave is weakened, and the diffraction intensity of the 0-level diffraction wave is reinforced, and thus, the thickness of the grating structure corresponding to the sub pixel R, the thickness of the grating structure corresponding to the sub pixel G and the thickness of the grating structure corresponding to the sub pixel B can be respectively designed to reach effects that the diffraction intensity of the 0-level diffraction wave is weakened, and the diffraction intensity of the 1-level diffraction wave is reinforced so as to improve the light emergent efficiency of the three-dimensional display device.

It should be noted that determination on the emergent angle of the emergent light in the Example II of the present disclosure is similar with determination on the emergent angle of the emergent light in the Example I of the present disclosure, and is not repeated herein. After the emergent angle θ of the light emerging from each grating structure is determined, the grating period P of each grating structure can be designed according to the emergent angle θ and the wavelength λ of the light emerging from each grating structure, so that the light emerging from the three-dimensional display device is converged into at least two viewpoints at the left eye and converged into at least two viewpoints at the right eye.

Figure 14:
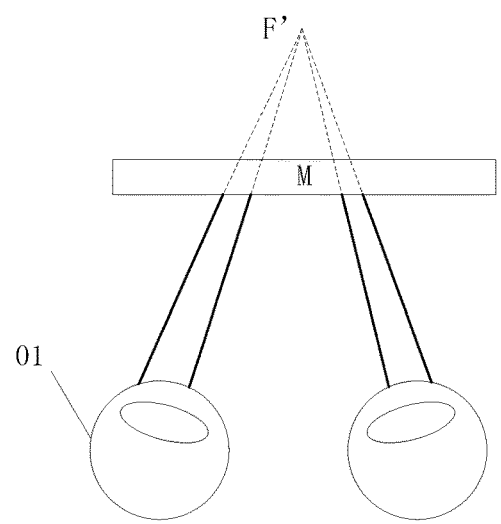
FIG. 14 is a schematic diagram that human eyes view a display image according to the three-dimensional display device provided by the embodiments of the present disclosure.

As illustrated in FIG. 14, sight lines of at least two viewpoints of the left eye and sight lines of at least two viewpoints of the right eye are converged to the same position F'. Therefore, the focusing position of one single eye is consistent with the converging position of the sight lines of double eyes.

In some examples, the three-dimensional display device provided by the examples of the present disclosure can also be applied to the OLED. When the three-dimensional display device provided by the examples of the present disclosure is applied to a bottom-emitting OLED, i.e., one side of a base substrate with an organic electroluminescent structure is the light emergent side, in this case, each grating structure can be located between the organic electroluminescent structure and the base substrate, or each grating structure can also be located on a side of the base substrate, which faces away from the organic electroluminescent structure, which is not limited herein. When the three-dimensional display device provided by the examples of the present disclosure is applied to a top-emitting OLED, i.e., a side of a packaging cover board is the light emergent side, in this case, each grating structure can be located between the organic electroluminescent structure and the packaging cover board, or each grating structure can also be located on a side of the packaging cover board, which faces away from the organic electroluminescent structure, which is not limited herein.

The three-dimensional display device provided by the embodiments of the present disclosure is mainly applied to a head-mounted virtual reality or augmented reality apparatus and can also be applied to any product or part with a display function, e.g., a mobile phone, a tablet personal computer, a television, a display, a notebook computer, a digital photo frame, a navigator and the like, and corresponding design can be correspondingly regulated according to specific factors of an eye-screen distance and the like.

The three-dimensional display device provided by the embodiments of the present disclosure includes a plurality of sub pixels and a plurality of grating structures corresponding to each sub pixel one to one; and each grating structure is used for enabling light to emerge according to the assigned direction, so that the emergent light of the three-dimensional display device is converged into at least two viewpoints at the left eye and converged into at least two viewpoints at the right eye. Therefore, the three-dimensional display device can implement single-eye focusing three-dimensional display, so that when a sight distance of the three-dimensional display device is designed to be equal to a sight distance of parallax three-dimensional display, the focusing position of one single eye and the converging position of the sight lines of double eyes can be guaranteed to be consistent, thereby avoiding a case that when the viewer views the three-dimensional display device, the viewer generates the dizzy feeling.

The foregoing is merely exemplary embodiments of the invention, but is not used to limit the protection scope of the invention. The protection scope of the invention shall be defined by the attached claims.

The present application claims priority of China Patent application No. 201610920762.2 filed on Oct. 21, 2016, the content of which is incorporated in its entirety as portion of the present application by reference herein.

The invention claimed is:

1. A three-dimensional display device, comprising: a plurality of sub pixels and a plurality of grating structures in a one-to-one correspondence with the plurality of sub pixels;

each grating structure is configured to enable light to emerge according to an assigned direction, so that emergent light of the three-dimensional display device is converged into at least two viewpoints at a left eye of an observer and converged into at least two viewpoints at a right eye of the observer.

2. The three-dimensional display device according to claim 1, comprising: a liquid crystal display panel and a backlight module on a side of the liquid crystal panel facing away from its light emergent side, wherein the liquid crystal display panel includes the plurality of sub pixels, and the backlight module includes: at least one waveguide portion arranged in a laminating mode and a collimation light source located at a position of a light incident surface of each waveguide portion; and each grating structure is located on a side of each waveguide portion facing the liquid crystal display panel.

3. The three-dimensional display device according to claim 2, wherein each grating structure meets that:

$$k_0 n_2 \sin\theta_2 = k_0 n_1 \sin\theta_1 - q\frac{2\pi}{\Lambda},$$

wherein $k_0$ represents a wave vector, $$k_0 = \frac{2\pi}{\lambda},$$

λ represents a wavelength of incident light, $n_1$ represents a refractive index of the waveguide portion, $n_2$ represent a refractive index of the air, $\theta_1$ represents a reflection angle for light to be totally reflected in the waveguide portion, $\theta_2$ represents an emergent angle of emergent light, Λ represents a grating period of the grating structure, and q=0, ±1, ±2, . . . .

4. The three-dimensional display device according to claim 2, wherein the at least one waveguide portion comprises a first substrate with a waveguide function.

5. The three-dimensional display device according to claim 4, wherein the at least one waveguide portion comprises one first substrate; the collimation light source is configured to emit white light; and each grating structure is located on a side of the first substrate facing the liquid crystal display panel.

6. The three-dimensional display device according to claim 4, wherein the at least one waveguide portion comprises three first substrates; corresponding collimation light sources located on the light incident surfaces of different first substrates respectively emit different colors of light; and each grating structure is located on a side of a corresponding first substrate irradiated by the collimation light source with the same color as the sub pixel corresponding to the each grating structure, the side of the corresponding first substrate facing the liquid crystal display panel.

7. The three-dimensional display device according to claim 4, wherein a thickness of each grating structure is in a range of 100 nm to 700 nm.

8. The three-dimensional display device according to claim 2, wherein the at least one waveguide portion comprises a waveguide layer; and the backlight module further comprises: a second substrate located on a side of the waveguide layer farthest from the liquid crystal display panel, the side of the waveguide layer facing away from the liquid crystal display panel.

9. The three-dimensional display device according to claim 8, wherein the at least one waveguide portion comprises one waveguide layer; the collimation light source is configured to emit white light; and each grating structure is located on a side of the waveguide layer facing the liquid crystal display panel.

10. The three-dimensional display device according to claim 8, wherein the at least one waveguide portion comprises three waveguide layers; corresponding collimation light sources located on the light incident surfaces of different waveguide layers respectively emit different colors of light; and each grating structure is located on a side of a corresponding waveguide layer irradiated by the collimation light source with the same color as the sub pixel corresponding to the grating structure, the side of the corresponding waveguide facing the liquid crystal display panel.

11. The three-dimensional display device according to claim 8, wherein the backlight module further includes: a buffer layer located on a side of each waveguide layer facing the second substrate.

12. The three-dimensional display device according to claim 8, wherein the refractive index of the waveguide layer is in a range of 1.7 to 2.

13. The three-dimensional display device according to claim 8, wherein a thickness of the waveguide layer is in a range of 100 nm to 100 μm.

14. The three-dimensional display device according to claim 8, wherein the thickness of each grating structure is in a range of 100 nm to 500 nm.

15. The three-dimensional display device according to claim 1, comprising: a liquid crystal display panel and a backlight module on a side of the liquid crystal panel facing away from its light emergent side, wherein the liquid crystal display panel includes the plurality of sub pixels, and the backlight module is a direct-lit collimated backlight;

each grating structure is located between the backlight module and the liquid crystal display panel; or, each grating structure is located inside the liquid crystal display panel; or, each grating structure is located on the light emergent side of the liquid crystal display panel.

16. The three-dimensional display device according to claim 15, wherein each grating structure meets that: $\sin\theta - \sin\theta_0 = \lambda/P$, where $\theta$ represents an emergent angle of emergent light, $\theta_0$ represents an incident angle of incident light, $\lambda$ represents a wavelength of the incident light, and P represents a grating period of the grating structure.

17. The three-dimensional display device according to claim 15, wherein an angle between light emitted by the backlight module and a plane where the liquid crystal display panel is located is in a range of 40 degrees to 80 degrees.

18. The three-dimensional display device according to claim 15, wherein a thickness of each grating structure is in a range of 100 nm to 700 nm.

19. The three-dimensional display device according to claim 1, wherein sight lines of at least two viewpoints of the left eye and sight lines of at least two viewpoints of the right eye are converged to the same position.

* * * * *